United States Patent
Caesar et al.

(10) Patent No.: US 7,600,561 B2
(45) Date of Patent: Oct. 13, 2009

(54) METHOD FOR AIR CONDITIONING A MOTOR VEHICLE

(75) Inventors: Roland Caesar, Stuttgart (DE); Jan Gaertner, Stuttgart (DE); Juergen Wertenbach, Fellbach (DE)

(73) Assignee: Daimler AG, Stuttgart (DE)

( * ) Notice: Subject to any disclaimer, the term of this patent is extended or adjusted under 35 U.S.C. 154(b) by 727 days.

(21) Appl. No.: 10/539,942

(22) PCT Filed: Dec. 3, 2003

(86) PCT No.: PCT/EP03/13630

§ 371 (c)(1),
(2), (4) Date: Jun. 17, 2005

(87) PCT Pub. No.: WO2004/058526

PCT Pub. Date: Jul. 15, 2004

(65) Prior Publication Data

US 2006/0169790 A1 Aug. 3, 2006

(30) Foreign Application Priority Data

Dec. 20, 2002 (DE) ................................. 102 61 179

(51) Int. Cl.
*B60H 1/00* (2006.01)
(52) U.S. Cl. ...................... 165/202; 165/222; 165/223; 165/230; 62/244
(58) Field of Classification Search .................. 165/42, 165/43, 44, 202, 203, 204, 51, 52, 223, 230, 165/231, 233; 62/90, 159, 160, 196.4, 230, 62/239, 244, 428
See application file for complete search history.

(56) References Cited

U.S. PATENT DOCUMENTS 5,299,431 A * 4/1994 Iritani et al. .................. 62/90
(Continued)

FOREIGN PATENT DOCUMENTS

DE 36 35 353 A1 4/1988
(Continued)

OTHER PUBLICATIONS

Kaefer: "Pkw-Klimatisierung—Umluftautomatik mit Feuchteregelung im Fahrzeuginnenraum," ATZ Automobiltechnische Zeitschrift, 1998, pp. 436-438, 440, 444, vol. 100, No. 6, Stuttgart, Germany.

*Primary Examiner*—Ljiljana (Lil) V Ciric
(74) *Attorney, Agent, or Firm*—Patent Central LLC; Stephan A. Pendorf

(57) ABSTRACT

A method for air conditioning a motor vehicle, in which, in a heating mode, the passenger compartment of the motor vehicle is heated via a passenger compartment heat exchanger (5) through heat pump operation of a refrigerating circuit (1). To prevent fogging of the windows of the motor vehicle from the outset, the temperature and humidity in the passenger compartment are recorded by measurement technology, and when the temperature is in a predefined range and the atmospheric humidity reaches a defined threshold, the mass flow of refrigerant in the circuit is throttled upstream of the passenger compartment heat exchanger (5), in such a manner that the moisture contained in the air stream passing the passenger compartment heat exchanger (5) is at least substantially condensed at the passenger compartment heat exchanger (5), and the moisture which has already condensed at the heat exchanger (5) remains at the heat exchanger (5). The passenger compartment is heated by a heat source which is outside the circuit (1) until the temperature in the passenger compartment exceeds an upper limit temperature of the predefined range.

6 Claims, 1 Drawing Sheet

U.S. PATENT DOCUMENTS

Figure 1:
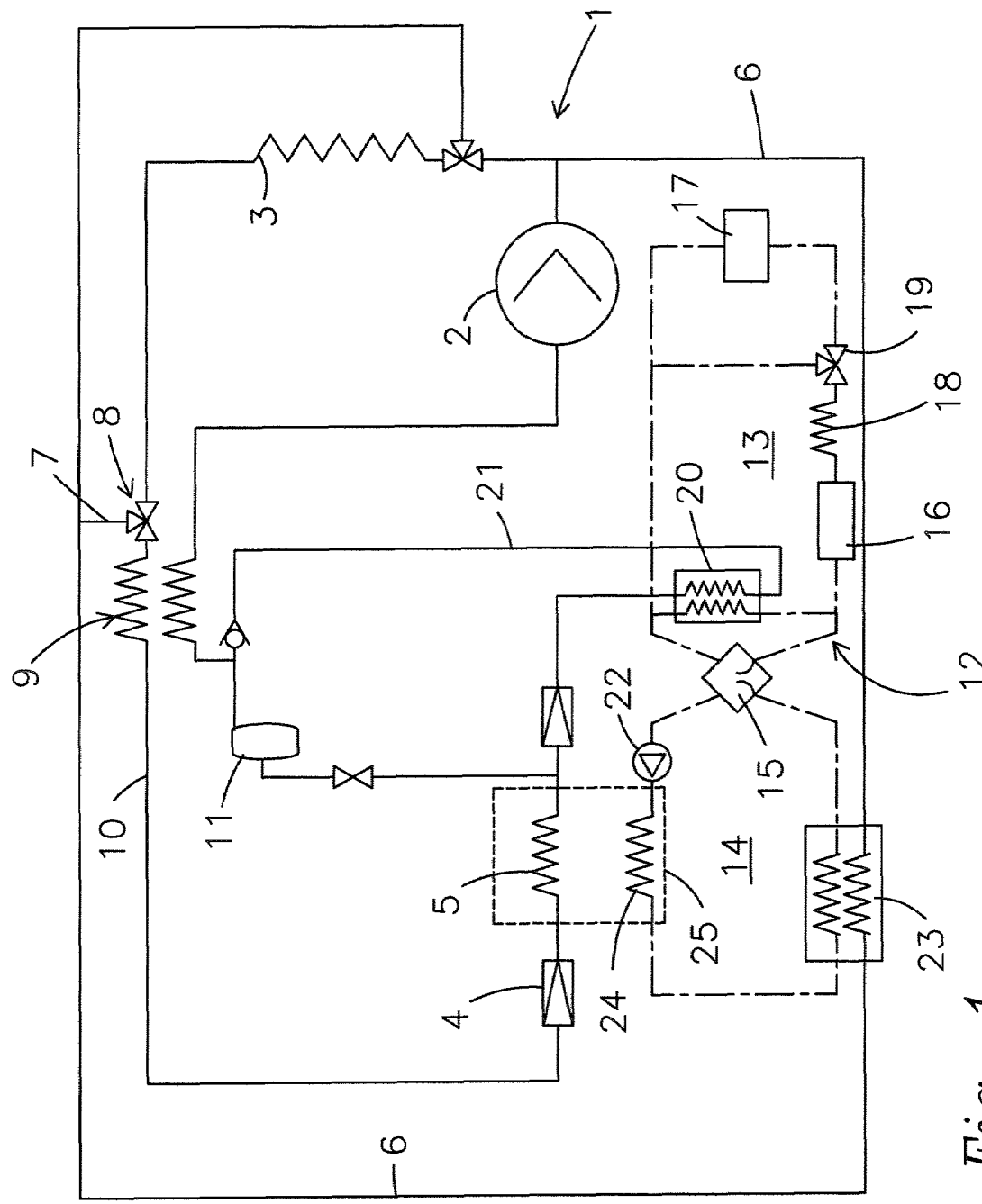

| | | | |
|---|---|---|---|
| 5,305,613 A * | 4/1994 | Hotta et al. | 62/230 |
| 5,331,823 A * | 7/1994 | Matsuoka | 62/196.4 |
| 5,355,689 A * | 10/1994 | Hara et al. | 62/159 |
| 5,388,421 A * | 2/1995 | Matsuoka | 62/90 |
| 5,572,881 A * | 11/1996 | Hotta et al. | 62/428 |
| 5,605,051 A * | 2/1997 | Iritani et al. | 62/160 |
| 5,685,162 A * | 11/1997 | Iritani et al. | 62/90 |
| 5,983,652 A * | 11/1999 | Iritani et al. | 62/90 |
| 6,044,653 A * | 4/2000 | Iritani et al. | 62/90 |
| 6,076,593 A * | 6/2000 | Takagi et al. | 165/202 |
| 6,212,900 B1 * | 4/2001 | Iritani et al. | 62/90 |
| 6,311,505 B1 | 11/2001 | Takano et al. | |
| 6,430,951 B1 * | 8/2002 | Iritani et al. | 62/160 |
| 2001/0035286 A1 | 11/2001 | Kobayashi et al. | |

FOREIGN PATENT DOCUMENTS

| | | |
|---|---|---|
| DE | 43 18 255 A1 | 12/1993 |
| DE | 197 22 577 A1 | 12/1998 |
| DE | 101 20 243 A1 | 12/2001 |
| DE | 101 29 290 A1 | 4/2002 |
| DE | 201 21 533 U1 | 11/2002 |
| EP | 1 112 871 A1 | 7/2001 |
| JP | 11-170849 A | 6/1999 |
| JP | 11-286211 A | 10/1999 |
| JP | 2002-219034 A | 8/2000 |
| WO | WO 02/092368 A1 | 11/2002 |

* cited by examiner

METHOD FOR AIR CONDITIONING A MOTOR VEHICLE

This application is a national stage of PCT/EP2003/013630 filed Dec. 3, 2003 and based upon DE 102 61 179.3 filed Dec. 20, 2002 under the International Convention.

BACKGROUND OF THE INVENTION

1. Field of the Invention

The invention relates to a method for air conditioning a motor vehicle.

2. Related Art of the Invention

A method of the generic type is known from DE 36 35 353 A1, in which it is described that the air-conditioning system should be run in heat pump mode in order to rapidly heat a passenger compartment and to defrost frozen or fogged windows. In this case, the actual condenser of the air-conditioning circuit is bypassed downstream of the compressor via a bypass line, after which the heated cooling medium passes through the evaporator, which functions as a condenser and also has an air stream passed into the passenger compartment passing through it. The cooling medium which has cooled there then takes up heat from a third heat exchanger, which serves as an evaporator and has the coolant of the internal combustion engine flowing through it. During a cold start of the engine and at low ambient temperatures of between −10 and +10° C., moisture has usually condensed or frozen on the evaporator. However, the air flowing past the evaporator into the passenger compartment takes up some of the moisture which is present at the evaporator and transports it, inter alia, onto the windows of the motor vehicle, which for a certain period of time leads to undesirable fogging of the windows.

SUMMARY OF THE INVENTION

The invention is based on the object of developing a method of the generic type in such a manner that fogging of the windows of the motor vehicle is prevented from the outset.

According to the invention, this object is achieved by the features set forth below.

As a result of the humidity within the passenger compartment in relation to the passenger compartment temperature being recorded by measurement technology and of a heat source which is external to the refrigeration circuit being used, the heat source for heating the passenger compartment is started up when a threshold value for the humidity at a defined temperature is reached. At the same time, the mass flow of refrigerant through the evaporator is throttled to a sufficient extent for there to be virtually no introduction of heat into the passenger compartment via the evaporator. As a result, the condensate remains at the heat exchanger forming the evaporator, or the feed air to the passenger compartment is dried by condensation at the evaporator. The external heat source as it were functionally replaces the evaporator for heating the passenger compartment. Only when a defined temperature level has been reached in the passenger compartment is the external heat source decoupled and the throttling of the mass flow of refrigerant through the evaporator relieved. This creates air-conditioning in which the passenger compartment can be heated at low temperatures without fogging of the windows. The method according to the invention is particularly advantageous when $CO_2$ is used as refrigerant, on account of the superior use qualities of $CO_2$ compared to other refrigerants in heat pump mode, which derive from its physical properties at the given pressure level.

BRIEF DESCRIPTION OF THE INVENTION

Expedient configurations of the invention are to be found in the subclaims; moreover, the invention is explained in more detail below on the basis of an exemplary embodiment illustrated in the drawings, in which the FIGURE diagrammatically depicts an air-conditioning circuit of a method according to the invention with a heating heat exchanger as external heat source.

DETAILED DESCRIPTION OF THE INVENTION

The FIGURE illustrates an air-conditioning circuit 1 of an air-conditioning system of a motor vehicle which can be used both to cool a passenger compartment of the motor vehicle and to heat the passenger compartment. The basic components of the circuit comprise a compressor 2, a condenser 3, a throttle valve 4 and an evaporator 5 used as passenger compartment heat exchanger. In heating mode, the circuit 1 is switched to heat pump operation, according to which the hot refrigerant—$CO_2$—which has been compressed to a high pressure level by the compressor 2 is made to bypass the condenser 3 via a bypass line 6. The hot refrigerant then passes a branch line 7, which is connected to the bypass line 6 and has a 3/2-way valve 8, from which it flows through the heat flux section of a countercurrent heat exchanger 9 of a continuation line 10, releasing a small amount of its heat to the cool countercurrent. Furthermore, the refrigerant, which is still relatively hot, flows through the throttle valve 4 and the downstream evaporator 5, which has feed air for the passenger compartment passing through it. In the process, the refrigerant releases at least the majority of its heat to the air stream which is used to heat the passenger compartment. The refrigerant, which is now cold, then flows onward via a 2/2-way valve to a collection tank 11, in which liquefied refrigerant fractions are stored in order to avoid damage to the compressor 2 when the refrigerant is sucked in and to serve as a reservoir when the demand for refrigerant rises. The collection tank 11 is followed by the cooling flux section of the countercurrent heat exchanger 9, in which the cold refrigerant is heated again to some extent, so that it can be entirely in gas form when it is sucked in by the subsequent compressor 2.

In addition to the air-conditioning circuit 1 which has been outlined, the vehicle is also equipped with an engine cooling circuit 12. This circuit comprises two sections 13 and 14, which are fluidically coupled to one another via a 4/2-way valve 15. Whereas an engine 16, a radiator 17, an exhaust-gas heat exchanger 18, a thermostatic valve 19 and a heat exchange section of a countercurrent heat exchanger 20, with the opposite part of the section incorporated in a secondary line 21, which branches off downstream of the evaporator 5, of the circuit 1, are arranged in section 13, the section 14 is equipped with a heating pump 22, a heat exchange section of a countercurrent heat exchanger 23, which section is thermally coupled to its opposite part arranged in the bypass line 6, and a heating heat exchanger 24. The heat exchanger 24, together with the evaporator 5, is arranged in an air-conditioning box 25 of the air-conditioning system.

Furthermore, the temperature and, in addition, the atmospheric humidity in the passenger compartment are recorded by measurement technology using suitable sensors, with the sensors which detect the humidity preferably being assigned to one or more windows. To fundamentally prevent fogging of the windows at low temperatures, first of all the circuit 1 is switched to heat pump operation, after which the hot refrigerant is passed through the compressor 2, via the bypass line 6, the branch line 7 and the throttle valve 4, to the evaporator 5, which first of all heats the passenger compartment by means of the air stream which passes through it and to which it releases a large proportion of heat. At the same time, however, the refrigerant is already transferring heat to the coolant of the circuit 12 at the countercurrent heat exchanger 23 of the circuit 12. In this phase, the circuit 12 is connected in such a way by the 4/2-way valve 15 that its two sections 13 and 14 are isolated from one another fluidically and completely with regard to heat transfer. Therefore, the heating pump 22 merely circulates the coolant of circuit 12 through section 14.

If the temperature is in a predefined temperature range and the atmospheric humidity reaches a defined threshold, after which unacceptable fogging of the windows will occur, the throttle valve 4 is controlled by signals from the temperature and humidity sensors in such a way that the mass flow of refrigerant in the circuit 1 upstream of the passenger compartment heat exchanger 5 is throttled to only a low throughput. In the process, the moisture contained in the air stream passing through the passenger compartment heat exchanger 5 is at least substantially condensed at the passenger compartment heat exchanger 5, while the moisture which has already condensed at the heat exchanger 5 remains at the heat exchanger 5. The coolant which is circulating in section 14 of the cooling circuit 12 has in the meantime been heated by the introduction of heat from the circuit 1 via the countercurrent heat exchanger 23 following the first heating phase, with the heat exchanger 24 now performing the initial role of the evaporator 5 and heating the passenger compartment by means of an air stream passing through it. In this case, the heat exchanger 24 compensates for the loss of heating power which results from the throttling of the mass flow of refrigerant upstream of the evaporator 5, and at the same time the evaporator 5 dries the air which is passed to the passenger compartment.

The heating of the passenger compartment by means of the heat exchanger 24 serving as heat source continues until the temperature in the passenger compartment exceeds an upper limit temperature of the predefined temperature range, above which it is impossible for any fogging precipitation to form on the windows, even at relatively high humidity levels. Then, the throttle valve 4 is opened again by means of the abovementioned sensors, so that the mass flow of refrigerant in the circuit 1 increases such that the passenger compartment can be sufficiently heated by way of the evaporator 5. The function of the heating heat exchanger 24 becomes subordinate if not completely irrelevant, and air no longer passes through it.

The heat which continues to be introduced into the circuit can now be used entirely to heat the engine 16 and the radiator 17, with the 4/2-way valve 15 being connected accordingly and the two circuit sections 13 and 14 being fluidically connected to one another.

Although it is conceivable for the passenger compartment to be heated by a different heat source located outside the circuit 1, it is highly advantageous to use the heating heat exchanger 24 of the engine cooling circuit 12, which is already present in any case, as the heat source, with a view to saving space.

Furthermore, it is also possible for the circuit 12 to be provided without a 4/2-way valve 15, which eliminates the need to disconnect the two circuit sections 13 and 14 from one another. Although this structurally simplifies the engine cooling circuit 12, the heat which has been introduced into this circuit 12 from the circuit 1 is distributed not just through section 14 but through the entire circuit 12, which leads to significantly slower and, in the worst possible scenario, inadequate heating of the passenger compartment. It is also conceivable to dispense with the countercurrent heat exchanger 23, which again represents a structural simplification. In this case, the only coupling between the two circuits 1 and 12 is via the countercurrent heat exchanger 20 which, however, has no effect on the heating of the passenger compartment. In this case, however, there is no heating of the passenger compartment when the engine is cold. Rapid heating of the engine is achieved mainly with relatively small engine designs, and consequently even halfway comfortable heating of the passenger compartment can only be expected with these designs of engine. By contrast, if the countercurrent heat exchanger 23 is provided, the compressor power can easily be used to heat the passenger compartment quickly and comfortably.

Furthermore, the heating of the passenger compartment is improved in terms of efficiency and speed if the air-conditioning system is switched to recirculated air and consequently the supply of fresh air is stopped. In this case, the refrigerant releases its heat in the countercurrent heat exchanger 23 and is throttled in throttle valve 4 to a pressure which correlates with a temperature such that the temperature at the surface of the passenger compartment heat exchanger 5 is below the dewpoint temperature which leads to fogging of the windows.

The invention claimed is:

1. A method for air conditioning a passenger compartment of a vehicle, said method comprising:
providing heat from a passenger compartment heat exchanger to the passenger compartment through heat pump operation of a refrigerating circuit (1) comprising a compressor (2) for pressurizing an automobile refrigerant, a condenser (3), a throttle valve (4) and an evaporator (5) used as a passenger compartment heat exchanger;
measuring the temperature in the passenger compartment with a temperature sensor;
measuring the atmospheric humidity in the passenger compartment with a humidity sensor; and
when the temperature is in a predefined range and the atmospheric humidity reaches a defined threshold:
controlling throttle valve (4) by signals from the temperature and humidity sensors to throttle the mass flow of refrigerant in the circuit upstream of the passenger compartment heat exchanger (5), in such a manner that the moisture contained in the air stream passing the passenger compartment heat exchanger (5) is at least substantially condensed at the passenger compartment heat exchanger (5), and the moisture which has already condensed at the heat exchanger (5) remains at the heat exchanger (5), and
heating the passenger compartment by a heat source which is outside the circuit (1) until the temperature in the passenger compartment exceeds an upper limit temperature of the predefined range.

2. The method as claimed in claim 1, wherein said temperature range and atmospheric humidity threshold are determined based on the dewpoint temperature which leads to fogging of the windows.

3. The method as claimed in claim 1, wherein said a heat source which is outside the circuit (1) includes a heating heat exchanger (24) which has heated engine coolant from an engine cooling circuit (12) flowing through it, and also has an air stream that is routed into the passenger compartment passing through it.

4. The method as claimed in claim 3, comprising heating, prior to throttling the mass flow of refrigerant in the refrigerating circuit (1), both the refrigerant and the engine coolant by means of the compressor (2), which acts in the heat pump, of the refrigerating circuit (1), with heat being removed from the refrigerating circuit (1) via a countercurrent heat exchanger (23) and transferred to the engine coolant.

5. The method as claimed in claim 4, wherein the heat is transferred only to the engine coolant of a first section (14) of the engine cooling circuit (12), which first section (14) includes a heating pump (22) and the heating heat exchanger (24), and wherein a second circuit section (13) of the engine cooling circuit (12), which includes the engine (16) and the radiator (17), are fluidically decoupled from the first circuit section (14).

6. The method as claimed in claim 1, wherein during heating, the air-conditioning system is switched to recirculated air, the refrigerant releasing its heat in the counter-current heat exchanger (23) and being throttled in the throttle valve (4) to a pressure which correlates with a temperature such that the temperature at the surface of the passenger compartment heat exchanger (5) is below the dewpoint temperature which leads to fogging of the windows.

* * * * *